(12) United States Patent
Siddiqui et al.

(10) Patent No.: US 10,264,128 B1
(45) Date of Patent: Apr. 16, 2019

(54) DYNAMIC MACHINE-LEARNING-BASED CONTACT PROCESSING

(71) Applicant: Amazon Technologies, Inc., Seattle, WA (US)

(72) Inventors: Salman Siddiqui, Raichur (IN); Vinay Garg, Ludiana (IN); Jeetendra Girdhar Mirchandani, Bellevue, WA (US); Ravindra Nath Kakarla, Visakhapatnam (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/797,271

(22) Filed: Oct. 30, 2017

(51) Int. Cl.
| | |
|---|---|
| *H04M 3/523* | (2006.01) |
| *H04M 3/51* | (2006.01) |
| *H04M 3/42* | (2006.01) |
| *H04L 29/06* | (2006.01) |
| *G06N 5/02* | (2006.01) |
| *G06N 99/00* | (2019.01) |
| *G06Q 10/10* | (2012.01) |
| *G06Q 20/10* | (2012.01) |
| *G06Q 10/08* | (2012.01) |

(52) U.S. Cl.
CPC .......... *H04M 3/5233* (2013.01); *G06N 5/022* (2013.01); *G06N 99/005* (2013.01); *G06Q 10/103* (2013.01); *H04L 63/102* (2013.01); *H04L 63/105* (2013.01); *H04M 3/42068* (2013.01); *H04M 3/5175* (2013.01); *H04M 3/5183* (2013.01); *G06Q 10/083* (2013.01); *G06Q 20/10* (2013.01); *H04M 2203/558* (2013.01)

(58) Field of Classification Search
CPC ............. H04M 3/5183; H04M 3/5191; H04M 7/0027; H04M 3/5233; H04M 2203/402; H04M 3/523
USPC ............ 379/265.09, 265.05, 265.11, 265.12, 379/265.01
See application file for complete search history.

(56) References Cited

U.S. PATENT DOCUMENTS

| | | | |
|---|---|---|---|
| 2016/0241579 A1* | 8/2016 | Roosenraad | ........ H04L 63/1425 |
| 2018/0278748 A1* | 9/2018 | Avila | .................... H04M 3/563 |

* cited by examiner

*Primary Examiner* — Thjuan K Addy
(74) *Attorney, Agent, or Firm* — Knobbe, Martens, Olson & Bear, LLP

(57) ABSTRACT

A dynamic contact management system is provided for managing customer contacts in a customer service center and dynamically determining which actions to take—or which actions are permitted to be taken—with respect to customer contacts. The system can process data regarding attributes of an agent or group of agents, and generate scores to use in making the dynamic determinations. Based on the scores, the system can temporarily authorize agents to perform actions that they would not otherwise be authorized to perform, assign customer contacts to agents who are most likely to resolve a contact in a satisfactory manner, generate dynamic comparisons of agents, and the like.

20 Claims, 7 Drawing Sheets

DYNAMIC MACHINE-LEARNING-BASED CONTACT PROCESSING

BACKGROUND

Generally described, customer service centers provide a centralized mechanism to handle customer contacts across a variety of contexts. For example, customer service centers may be implemented to handle contacts relating to sales and marketing, technical support, and billing. In a common scenario, a customer service center for a large enterprise may handle customer service calls and other communications regarding a large number of issues related to disparate products and services. To provide service for the different types of issues that can arise across the disparate products and services, the customer service center may use groups of agents specifically trained to handle issues in particular areas. When a customer contact is received, the contact can be routed to a group of customer service representatives trained to handle the issue that the customer is experiencing.

In some customer service centers, groups of agents are organized into subgroups based on, e.g., seniority, level of expertise, or the like. Individual subgroups may have authority to perform certain functions without permission, and may require permission from agents in other subgroups to perform other functions. For example, a customer service agent may be permitted to handle certain types of returns or refunds, but may require permission from a supervisor, or transfer to a supervisor in order to handle other types of actions or to handle refunds of higher values than permitted for the lower level agents.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
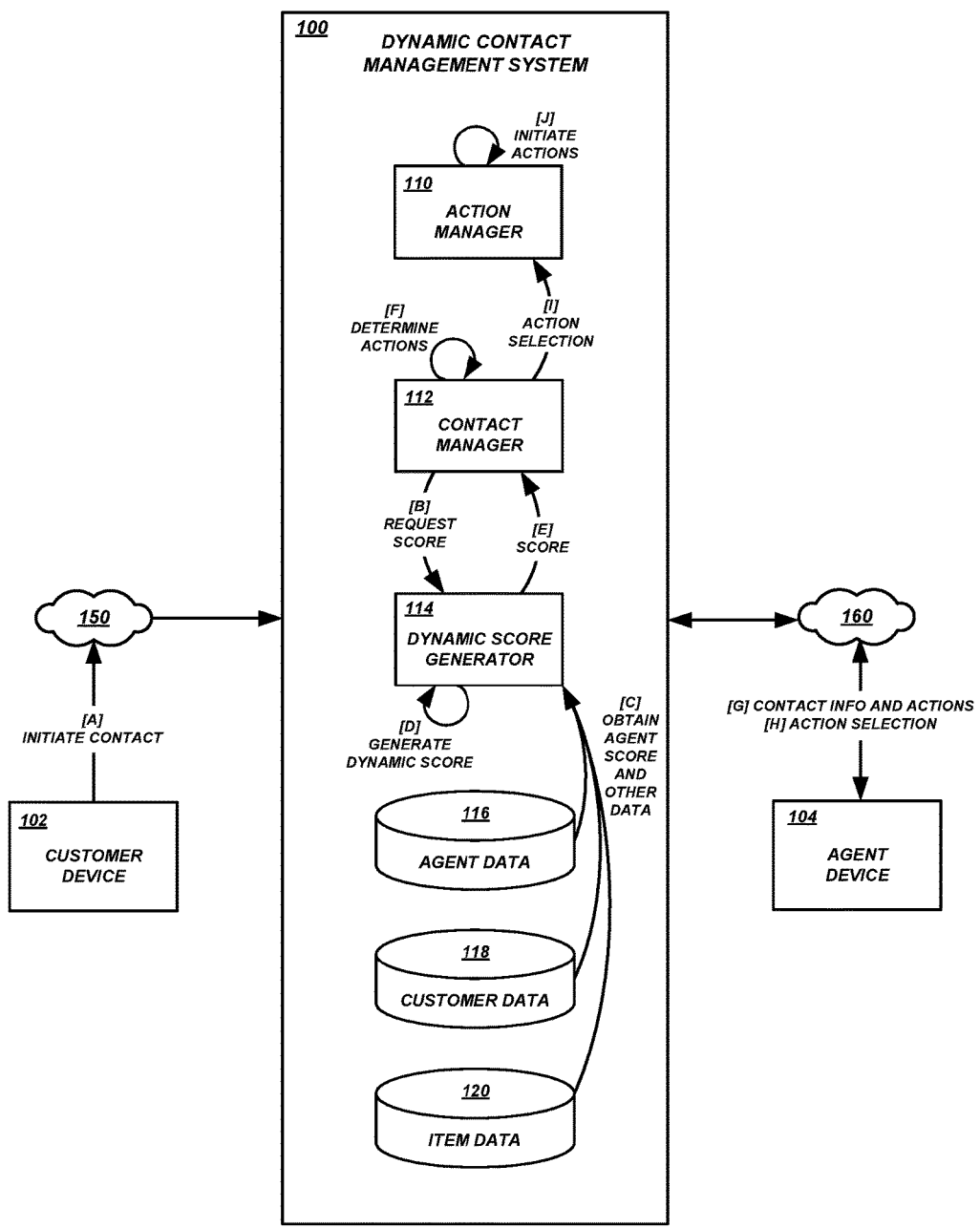
FIG. 1 is a block diagram of various data flows and interactions between a dynamic contact management system, a customer device, and an agent device according to some embodiments.

The present disclosure is directed to a system that dynamically determines which actions to take—or which actions are permitted to be taken—with respect to customer contacts processed by a customer service system. The system can process data regarding attributes of an agent or group of agents, and generate scores to use in making the dynamic determinations. The scores may indicate an effectiveness or competence of a particular agent to perform actions to resolve customer contacts. For example, a score may indicate a relative measurement of an agent's effectiveness with respect to an ideal agent, or with respect to an actual agent that has been determined to be the most effective. Based on the scores, the system can empower agents to resolve customer contacts based upon their own performance on an individualized basis. For example, the system can temporarily authorize agents to perform actions that they would not otherwise be authorized to perform, assign customer contacts to agents who are most likely to resolve a contact in a satisfactory manner, generate dynamic comparisons of agents, and the like. Advantageously, the dynamic determination of which actions to take—or which actions are permitted to be taken—allows the system to increase the likelihood of a recommended resolution to a customer contact on a case-by-case basis.

Generally described, a customer contact, also referred to herein as a "contact" for convenience, may be any conversation or other communication related to an issue, question, or other topic of interest. The contact may be initiated by, received from, or otherwise include communication with a customer or other entity. The contact may take any of a variety of forms. For example, a contact may include a telephone conversation initiated by a customer regarding an issue with a product. As another example, a contact may include an instant message conversation or "chat" with a potential customer, whether initiated by the customer or the customer service system. As a further example, a contact may include an email or text message from a customer posing a question about a topic. Customer contacts may be initiated for any of a variety of reasons, such as contacts for refunds, replacements, exchanges, and the like. The example contacts described herein are illustrative only, and are not intended to be limiting. In some embodiments, a customer service system may deal with any or all of these contacts, other types of contacts, some combination thereof, etc.

Some conventional customer service systems attempt to assign customer contacts to an appropriate agent who is specifically trained to resolve the customer contact in a satisfactory manner. If that agent determines that a particular action is required to be taken to successfully resolve the customer contact, and the agent does not have authority to perform or otherwise initiate the action, then the agent typically begins an often manual process of contacting a supervisor or other individual with authority to perform, initiate, or permit the action. For example, the manual process may include initiating a chat or sending an email to a supervisory, accessing a support management system to open a ticket or escalate the contact, making a telephone call or physically walking to a supervisor's desk, or any other internal escalation mechanism that causes a delay in resolving the current customer contact. This process can be inefficient for the agents, cause unacceptable delay for the waiting customers, negatively impact the customer experience, add to the cost of resolving the contacts by requiring additional agent and supervisor efforts, and otherwise contribute to suboptimal resolutions to customer contacts. In addition, some conventional customer service systems select the particular agent to whom a customer contact is to be assigned using static information about the agent and/or the customer (e.g., level of the agent within a hierarchy, contact history for a customer, etc.), or based on limited dynamic rules such as workload. This conventional agent selection process can produce suboptimal results as it does not consider agent performance and experience attributes and contact context in a dynamic manner and on a case-by-case basis.

Some aspects of the present disclosure relate to the dynamic analysis of agent information and context information associated with a customer contact (e.g., customer-specific information, item-specific information, etc.) to determine which agent is most likely to resolve the customer contact in a satisfactory manner, which actions an agent is permitted to perform with respect to a contact, or the like. The dynamic analysis, which may be performed using a specially trained machine learning model, facilitates not just the mere automation of the previously manual or static processes of selecting agents and approving actions. Rather, dynamic analysis as described herein provides data-driven optimizations to the previously manual or static processes of selecting agents and approving actions, beyond the mere implementation of those processes in a computing system. For example, a system implementing the dynamic analysis and features described herein can automatically empower an agent to perform a range of actions with respect to a particular customer contact, without requiring the agent to first seek authorization from a supervisor. Such a system can also ensure that while the agent is empowered to perform a range of actions that the agent may not be authorized to perform by default, the range of actions includes only actions that can facilitate a satisfactory or recommended solution without negatively impacting other areas of the system as represented by various performance metrics (e.g., timing, losses, customer satisfaction, etc.). As another example, customer contacts can be routed to agents most likely to resolve the customer contacts in a satisfactory or recommended manner even if such a routing would cause a delay or would otherwise not be implemented using conventional workload balancing systems. Moreover, the dynamic analysis and features described herein reduce the need for hierarchical authorization protocols and therefore allow customer service centers to be reorganized.

Although aspects of some embodiments described in the disclosure will focus, for the purpose of illustration, on particular examples of contacts, attributes, contextual information, and underlying data associations, the examples are illustrative only and are not intended to be limiting. In some embodiments, the techniques described herein may be applied to additional or alternative contacts, attributes, contextual information, and underlying data associations. Various aspects of the disclosure will now be described with regard to certain examples and embodiments, which are intended to illustrate but not limit the disclosure.

Network-Based Customer Service Environment

With reference to an illustrative embodiment, FIG. 1 shows a network environment in which aspects of the present disclosure may be implemented. As shown, the network environment may include a dynamic contact management system 100, a customer device 102, and an agent device 104. The customer device 102 and agent device 104 may communicate with the dynamic contact management system 100 and/or each other via one or more communication networks, such as communication networks 150 and 160. The communication networks are also referred to herein as "networks" for convenience.

In some embodiments (e.g., when a customer device 102 is a telephone), network 150 may be a circuit-switched network or other telephone network. For example, network 150 may be a publicly-accessible telephone network, such as the public switched telephone network ("PSTN") or a cellular telephone network. In these embodiments, network 150 may be referred to as a "phone network" to highlight its use as a network for transmitting telephone communications such as telephone call audio, text messages, and the like. In other embodiments, such as when a customer device 102 is configured to establish telephone calls using voice over IP ("VOIP") or communicate using other computer-based methods (e.g., instant message, email, etc.), then network 150 may be a packet-switched data network. For example, network 150 may be a publicly-accessible network of linked networks, possibly operated by various distinct parties, such as the Internet. In some cases, the network 150 may include a private network, personal area network, local area network, wide area network, cable network, satellite network, cellular data network, etc., or a combination thereof, some or all of which may or may not have access to and/or from the Internet. In these embodiments, network 150 may be referred to as a "data network" to highlight its use as a network for transmitting bit-encoded data.

In some embodiments, network 160 may be or include a phone network and/or a data network, similar to network 150, depending upon the particular agent device 104 or communication method being used for a given contact. Although networks 150 and 160 are shown as separate networks, in some embodiments a single network may be used by both a customer device 102 and agent device 104 to communicate with the dynamic contact management system 100 and/or each other.

The dynamic contact management system 100 may include various components for providing the features described herein. In some embodiments, the dynamic contact management system 100 may include an action manager 110 for initiating actions for resolving customer contacts. For example, the action manager 110 may initiate delivery of a replacement item, initiate item return procedures, manage the exchange of funds, manage establishment and/or switching of communication connections (e.g., telephone calls), etc. In some embodiments, the dynamic contact management system 100 may also include a contact manager 112 for managing communications between the customer device 102 and agent device 104, and for managing the process of resolving a customer contact through performance of various actions. For example, the contact manager 112 may determine which actions an agent may take with respect to a customer contact based on a dynamic score generated using agent data and, in some cases, context information associated with the particular customer contact. In some embodiments, the dynamic contact management system 100 may include a dynamic score generator 114 for dynamically generating a score using a model, agent data and, in some cases, context information associated with the particular customer contact.

The dynamic contact management system 100 may also include various data stores for storing information used by the other components of the dynamic contact management system 100. Illustratively, the dynamic contact management system 100 may include an agents data store 116 for storing data regarding agent attributes, such as data regarding the agents' tenure, average handling time for contacts, positive feedback regarding handling contacts, number and/or value of certain actions taken (e.g., concessions provided to customers overall, concessions over or below a threshold, etc.), number and/or value of non-standard actions taken (e.g., concessions that do not follow policy guidelines), ratio of action permission requests that have been granted or rejected, history with prior customers, items, or issues, etc. The dynamic contact management system 100 may also include a customers data store 118 for storing data regarding customer attributes, such as account information, history, measurements of customer difficulty, etc. The dynamic contact management system 100 may also include an items data store 120 for storing information about item attributes for particular items or topics of customer contacts, such as an item defect rate or data regarding a history of item issues, returns, refunds, etc.

The example components and data stores of the dynamic contact management system 100 shown in FIG. 1 are illustrative only, and are not intended to be limiting. In some embodiments, a dynamic contact management system 100 may have fewer, additional, and/or alternative components and data stores.

The dynamic contact management system 100 may be implemented on one or more physical server computing devices that provide computing services and resources to customer devices 102 (also referred to as "user devices"). In some embodiments, the dynamic contact management system 100 (or individual components thereof, such as the action manager 110, contact manager 112, dynamic score generator 114, etc.) may be implemented on one or more host devices, such as blade servers, midrange computing devices, mainframe computers, desktop computers, or any other computing device configured to provide computing services and resources. For example, a single host device may execute one or more action managers 110, contact managers 112, dynamic score generators 114, data stores 116, 118, 120, some combination thereof, etc. The dynamic contact management system 100 may include any number of such hosts.

In some embodiments, the features and services provided by the dynamic contact management system 100 may be implemented as web services consumable via one or more communication networks. In further embodiments, the dynamic contact management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual customer devices 102 and agent devices 104 may be any of a wide variety of electronic communication devices, including telephones, personal computing devices, terminal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances.

In some embodiments, a customer or agent may use a system of multiple devices, rather than a single customer device 102 or agent device 104. For example, a customer may use a telephone to communicate verbally with an agent while also using a tablet computing device to communicate textually, via video, or as the source of the issue that gave rise to the contact. As another example, an agent may use a desktop computer to view information about the customer and how to resolve the issue that gave rise to the contact, while also using a telephone to communicate verbally with the customer.

As shown in FIG. 1, a customer device 102 may initiate a customer contact with the dynamic contact management system 100 at [A]. Initiating the customer contact may include initiating a communication session with the dynamic contact management system 100, such as a telephone call, a video call, a text-based chat, an email conversation, etc. Information regarding the nature of the contact may also be provided to the dynamic contact management system 100. Illustratively, metadata may be associated with the communication (e.g., an account identifier such as a phone number provided with a phone call), or information regarding the contact may be provided in the content of the communication (e.g., as text in an email, as an utterance to an automatic speech recognition component or a live operator, as a menu selection of an interactive phone system or web page, etc.). In one specific, non-limiting example, the contact may be initiated as a text-based chat transmission from the customer device 102 to the dynamic contact management system 100, and the transmission may include metadata or content data indicating the contact is in relation to a particular item, such as an item that the customer purchased and for which the customer would like a refund or exchange.

The contact manager 112 may request a dynamic score from the dynamic score generator 114 at [B]. In some embodiments, the contact manager 112 may specify which agent account is to be used when generating the score. For example, if the customer contact has already been assigned to particular agent account, then the contact manager 112 may wish to determine which actions the agent account is permitted to perform. The request for the dynamic score may therefore include an identifier of the agent account. In some embodiments, the request may include additional or alternative information, such as information regarding the specific customer account (also referred to as "user account") associated with the customer contact, the item associated with the customer contact, other contextual information, some combination thereof, etc.

The dynamic score generator 114 may retrieve information from one or more data stores at [C] for use in generating a dynamic score for the current contact. In the present example, the request from the contact manager 112 may specify the agent account, customer account, and item associated with the customer contact. The dynamic score generator 114 may then obtain information from the appropriate data stores for use in generating the dynamic score. Illustratively, the information may include attribute information regarding the agent account (data regarding a tenure of the agent associated with the agent account, average handling time for contacts, positive feedback regarding handling contacts, number and/or value of certain actions taken, number and/or value of non-standard actions taken, ratio of action permission requests that have been granted or rejected, history with the current customer account and/or item, etc.), customer account information (e.g., customer account history, measurements of customer difficulty, etc.), item information (e.g., history of contacts, issues, and the like associated with the current item, etc.), and the like.

In some embodiments, the dynamic score generator 114 may obtain predetermined or dynamically determined scores for the current agent account, customer account, and/or item, rather than (or in addition to) data for determining the scores. For example, the dynamic score generator 114 may access a previously-generated agent account score from the agents data store 116. As another example, the dynamic score generator 114 may obtain a customer account score (such a relative measurement of customer difficulty with resolving contacts, or a relative measurement of customer abuse of the return/concession process) from another service, such as a customer score generator (not shown). As yet another example, the dynamic score generator 114 may obtain data from the item data store 120 for the current item, and may determine an item score separately (e.g., before continuing, in parallel with other processes, etc.).

The agent account score, also referred to as an "agent score" and labeled as such in FIG. 1, may be determined in-line (e.g., as part of the current process) or offline (e.g., as part of a batch process and stored in a data store). As described in greater detail below, the agent score may be determined using a model trained to generate or "predict" an agent score based on information regarding agent account attributes, such as attributes regarding historical performance and experience. For example, the agent score may be determined using a machine learning model trained using data regarding attributes of a multiple agent accounts. The machine learning model may then be used to predict the score for a new agent account for which there is little data regarding historical performance or experience. In this way, agent scores may be determined for any agent, regardless of the amount of historical performance or experience data from which to draw upon.

Figure 4:
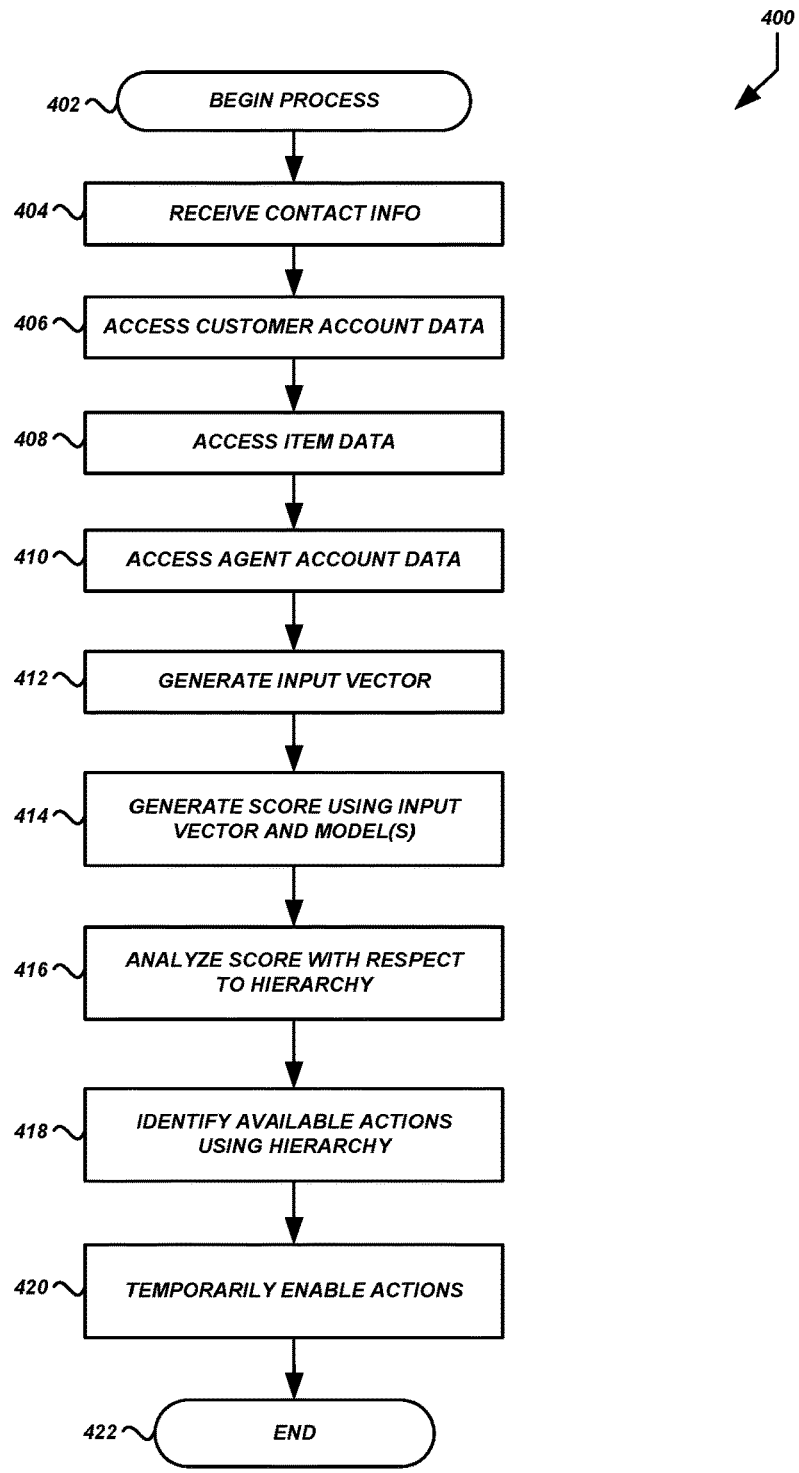
FIG. 4 is a flow diagram of an illustrative process for determining a temporary level of authorization to perform actions in connection with a customer contact according to some embodiments.
Figure 5A:
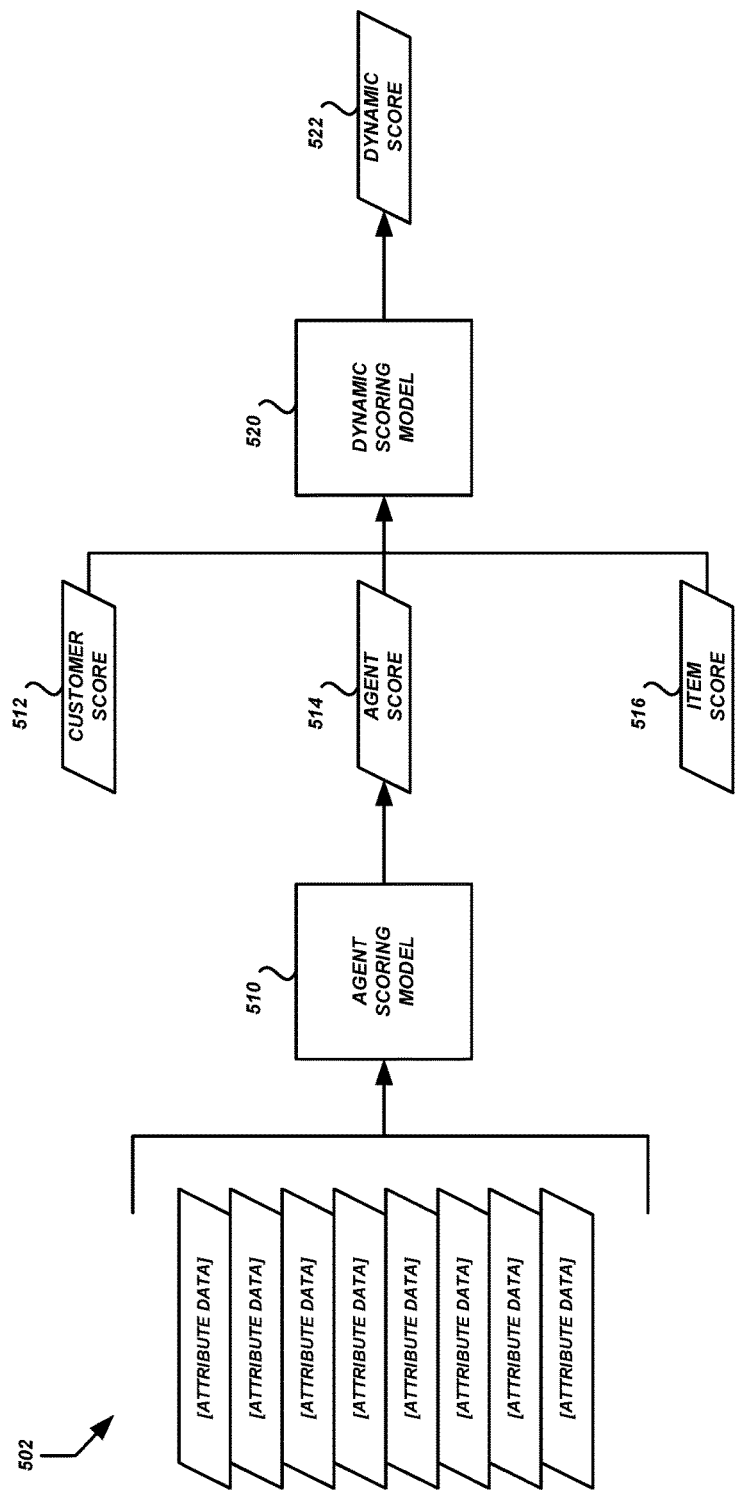
FIG. 5A is a diagram of illustrative models for use in generating dynamic scores according to some embodiments.
Figure 5B:
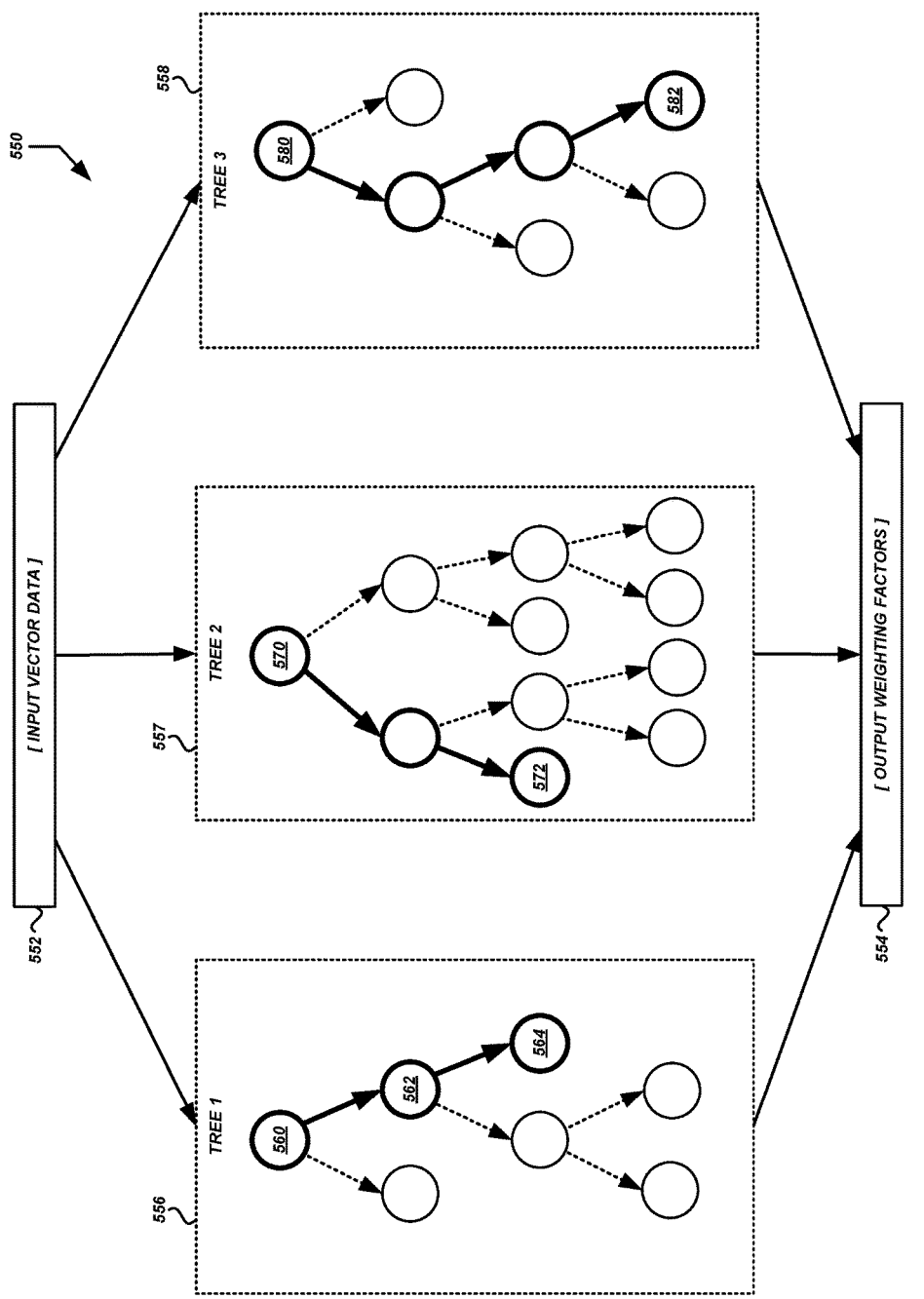
FIG. 5B is a diagram of an illustrative model for use in generating weights according to some embodiments.

The dynamic score generator 114 may generate a dynamic score for the current contact at [D]. The dynamic score generator may generate the dynamic score using a model or set of models trained to generate such scores from the input data provided by the dynamic score generator 114. In the current example, the dynamic score generator 114 may generate an input vector using the information that was obtained from the data stores, other score generators, etc. In some embodiments, the dynamic score generator 114 may then process the input vector using a model, such as a random forest model, to dynamically determine weighting factors (also referred to as "weights") that will be used in generating the score for this particular agent account in the context of this contact. The weights may be weighting factors for individual attributes of agent account data, customer account data, item data, or some combination thereof. Advantageously, by using a model to dynamically generate attribute weights on a case-by-case basis, the score that is subsequently generated for the agent account may be dynamic in the sense that it depends directly on the context of the customer contact. For example, certain agent attributes may be more important to satisfactory contact resolution—and therefore may be weighted more heavily—depending upon the type of contact at issue, the type of item at issue, etc. A statistical model may then use the dynamically determined weights to generate the dynamic score for a particular agent account in the context of the current contact. A detailed example of dynamic score generation is illustrated in FIGS. 4, 5A, and 5B and described in greater detail below. The example is illustratively only, and is not intended to be limiting. In some embodiments, other processes or other types of models may be used. For example, the model used by the dynamic score generator 114 may be a neural network, conditional random field, or the like. The dynamic score generator 114 may provide the dynamic score to the contact manager 112 at [E].

The contact manager 112 may determine at [F] which actions are available to be performed by the agent account with respect to the current customer contact. In some embodiments, the agent account may be associated with a particular level of an authority hierarchy. Individual levels of the authority hierarchy may be associated with different sets of actions that may be performed with respect to contacts, or with different sets of action parameters for performing actions with respect to customer contacts. An agent account assigned to a first level of the hierarchy may therefore be permitted to perform a first set of actions, and an agent account assigned to a second level of the hierarchy that is higher than the first level may be associated with a second set of actions. The second set of actions may be larger than the first set of actions, and/or the second set of actions may include actions that have a larger effect on the dynamic contact management system 100, customer account, etc. For example, agent accounts assigned to the first level of the hierarchy may be permitted to issue refunds and exchanges up to a certain maximum amount, whereas agent accounts assigned to the second level may be permitted to issue refunds and exchanges up to a larger maximum amount. As another example, agent accounts assigned to the first level may be permitted to issue refunds or exchanges, whereas agent accounts assigned to the second level may be permitted to issue refunds or exchanges and also provide other concessions to resolve customer issues (e.g., free goods and services, upgraded goods and services, etc.).

Figure 2A:
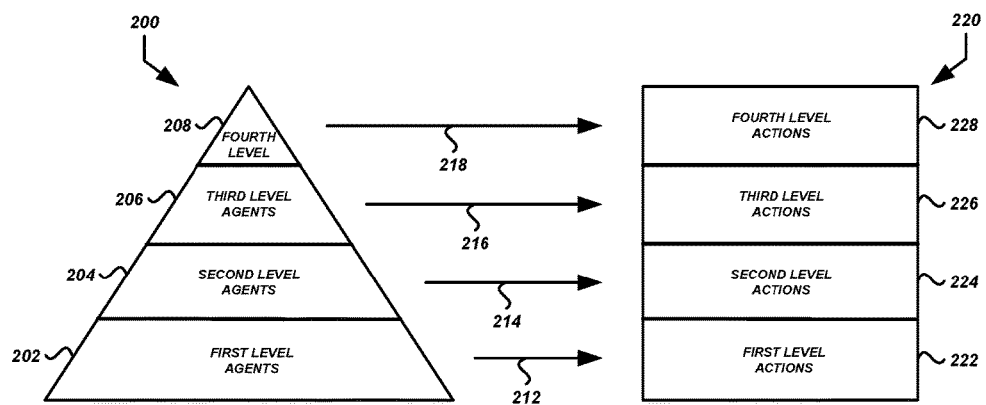
FIG. 2A is a diagram of an illustrative authority hierarchy and corresponding default authorization levels according to some embodiments.

FIG. 2A illustrates an example of an authority hierarchy 200 and the corresponding authorized actions 220 that may be taken by agents assigned to each level of the hierarchy 200. As shown, the lowest level 202 of the hierarchy 200 may be the largest level (e.g., level 202 includes the largest number of agent accounts), the second lowest level 204 may be the second largest level, the second highest level 206 may be the second smallest, and the highest level 208 may be the smallest level (e.g., level 208 may include the smallest number of agent accounts). The example hierarchy 200 and levels are illustrative only, and are not intended to be limiting. In some embodiments, a hierarchy with fewer, additional, and/or alternative levels may be used, or individual levels may each have different numbers of agent accounts or the same number of agent accounts.

The lowest level 202 may have a default assignment 212 to group 222 of authorized actions 220. The group 222 may include the actions that agent accounts in level 202 are permitted to perform, such as initiating transactions (e.g., refunds, exchanges, etc.) with a value not to exceed a threshold. The second lowest level 204 may have a default assignment 214 to group 224, which may include the actions that agent accounts in level 204 are permitted to perform (e.g., initiating transactions with a value not to exceed a higher threshold than the threshold in group 222). The second highest level 206 may have a default assignment 216 to group 226, which may include the actions that agent accounts in level 206 are permitted to perform (e.g., initiating transactions with a value not to exceed a higher threshold than the threshold in groups 222 and 224). The highest level 208 may have a default assignment 218 to group 228, which may include the actions that agent accounts in level 208 are permitted to perform (e.g., initiating transactions with a value not to exceed the highest threshold in of all of the authorized actions 220).

Figure 2B:
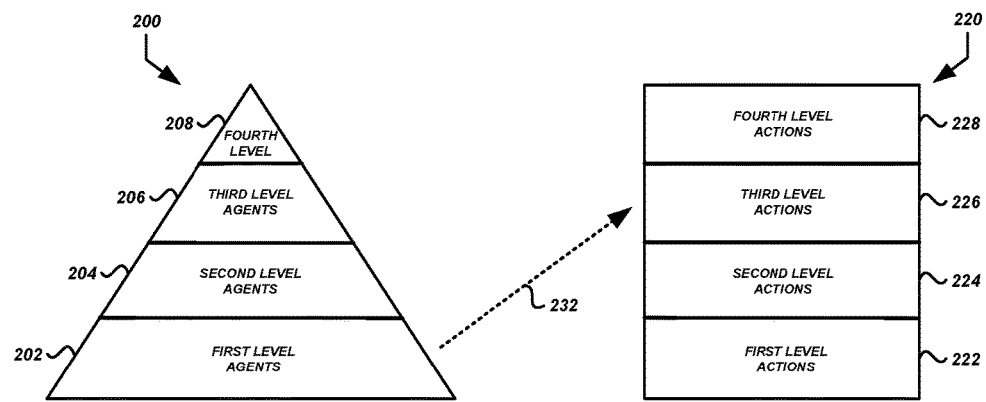
FIG. 2B is a diagram of an illustrative authority hierarchy and corresponding temporary grant of authorization levels according to some embodiments.

FIG. 2B illustrates the authority hierarchy 200 with a dynamically determined assignment 232 for an agent account at level 202 of the hierarchy 200 to a group 226 of authorized actions 220. The dynamically determined assignment 232 is different than the default assignment 212 for agent accounts at level 202. The dynamically determined assignment 232 may be based on the score generated by the dynamic score generator 114. For example, the dynamic score generator 114 may generate a score for a given combination of agent account, customer account, and item. The score may be indicative of a specific group of the authorized actions 220, or the contact manager 112 may transform the score into a value indicative of a particular group of actions. Illustratively, the dynamic score generated for the current agent account, which may be in level 202 and assigned by default to group 222, may be used to reassign 232 the agent to group 226.

In some embodiments, the dynamic score may be a score generated or normalized to be between 0 and 1. If the dynamic score satisfies a first threshold (e.g., is equal to or greater than 0.6), then the agent account may be authorized to perform actions assigned to one hierarchy level above the level of the agent account. If the score satisfies a second threshold (e.g., is equal to or greater than 0.8), then the agent account may be authorized to perform actions assigned to hierarchy level that is two levels above the level of the agent account. There may be some maximum number of levels that an agent account may be temporarily authorized above its current level (e.g., no more than 2 levels above the current level for the agent account), or there may be an absolute maximum level above which no agent account may be temporarily authorized (e.g., level 206). In the example illustrated in FIG. 2B, the agent account may perform the actions in group 226, rather than being limited to the actions in group 222. In this way, the dynamic contact management system 100 can automatically and dynamically authorize agents to perform actions in certain cases that they would not otherwise be authorized to perform, or for which they would require manual authorization by another agent, such as an agent associated with an agent account in a higher level of the hierarchy 200.

The contact manager 112 may provide, to the agent device 104 at [G], information regarding the current customer contact and information regarding the actions available to be taken with respect to the current customer contact. At [H], the contact manager 112 may receive from the agent device 104 data indicating which action or actions, if any, are to be taken to resolve the current contact. The contact manager 112 may then send, at [I], information regarding the selected actions to the action manager 110 (or an appropriate action manager 110 if there are different action managers responsible for managing different actions). The action manager 110 can then perform the action(s) at [J].

Figure 3:
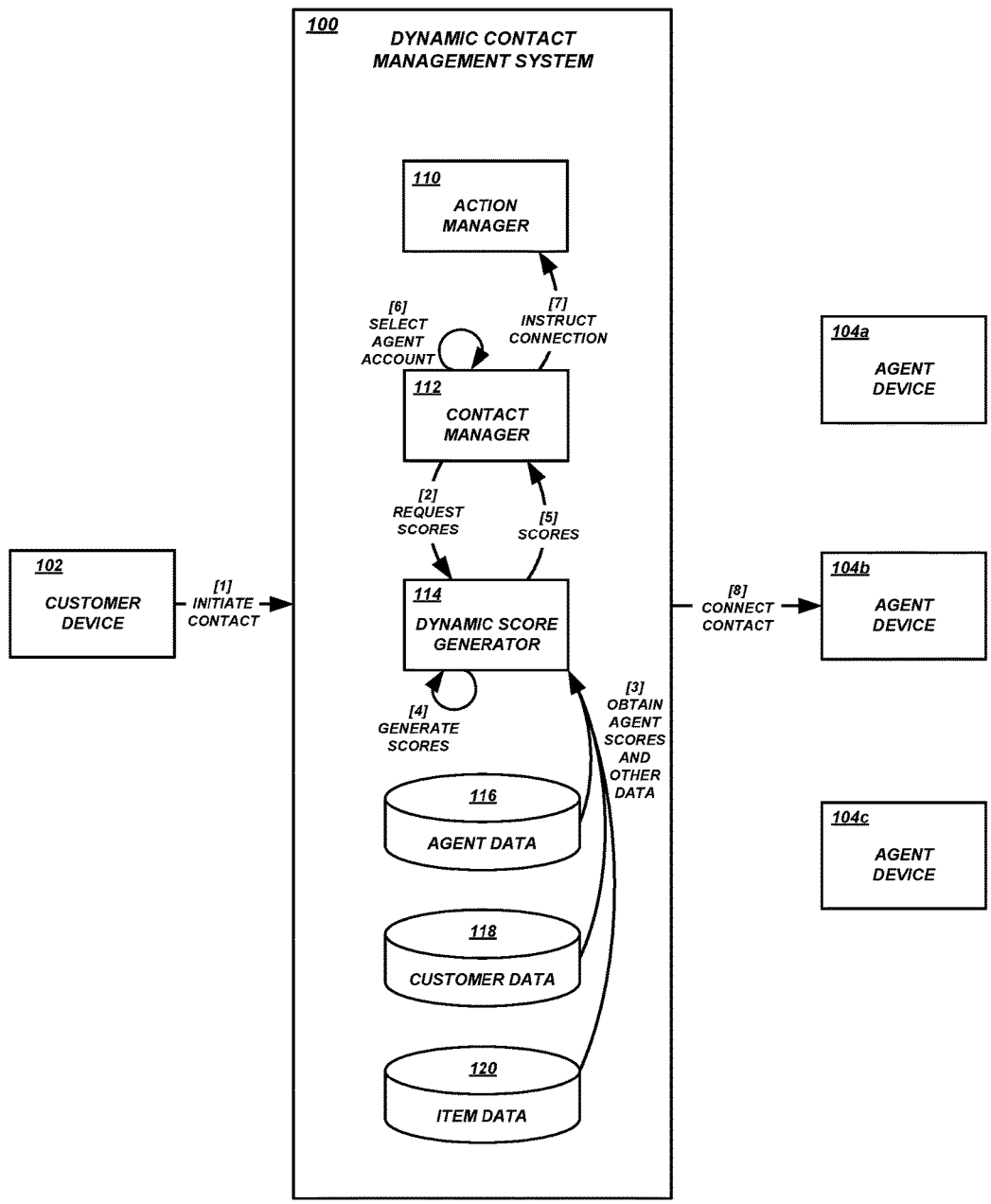
FIG. 3 is a block diagram of various data flows and interactions between a dynamic contact management system, a customer device, and various agent devices according to some embodiments.

Turning now to FIG. 3, example data flows and interactions occurring during the process of using dynamic scores to select an agent account to handle a customer contact are shown. At [1], a customer device 102 may initiate a customer contact with the dynamic contact management system 100. Initiating the customer contact may include initiating a communication session with the dynamic contact management system 100, such as a telephone call, a video call, a text-based chat, an email conversation, etc. As described above, information regarding the nature of the contact may also be provided to the dynamic contact management system 100. In one specific, non-limiting example, the contact may be initiated as a telephone call from the customer device 102 to the dynamic contact management system 100. The dynamic contact management system 100 may obtain information regarding the nature of the contact, such as by presenting menu options for the customer to speak or otherwise provide information regarding the customer account, the item about which the customer is calling, etc.

The contact manager 112 may request one or more dynamic scores from the dynamic score generator 114 at [2]. For example, the contact manager 112 may request the dynamic score generator 114 to produce scores for all agents, or for a group of agents identified for this particular contact (e.g., a group of agents with expertise that includes the likely issue associated with the current customer contact).

The dynamic score generator 114 may retrieve information from one or more data stores at [3] for use in generating dynamic scores. Illustratively, the information may include attribute information regarding the agent accounts, customer account information, item information, other information, or some combination thereof. The dynamic score generator 114 may then generate dynamic scores at [4]. The dynamic score generator may generate the dynamic scores using one or more models trained to generate such scores from the input data provided by the dynamic score generator 114. At [5], the dynamic score generator 114 may provide to the contact manager 112 the generated scores, or a subset thereof, such as the highest score or highest n scores, where n is a positive integer, or the top r percentage of scores, where r is a positive real number.

The contact manager 112 may select at [6] the agent account that will be assigned to handle the current customer contact. For example, the dynamic score generator 114 may have generated a score of 0.55 for an agent account associated with agent device 104*a*, a score of 0.86 for an agent account associated with agent device 104*b*, and a score of 0.13 for an agent account associated with agent device 104*c*. The contact manager 112 may select the agent account with the highest score—in this case, the agent account associated with agent device 104*b*. In some embodiments, the contact manager 112 may perform other processing to select an agent account, such as analyzing the dynamic scores in combination with workload information for agent accounts, or other information.

Once an agent account has been selected, the contact manager 112 may instruct the action manager 110 at [7] to connect the customer contact to the appropriate agent device. In the present example, the action manager 110 may switch the telephone call to the selected agent device 104*b* at [8].

Example Process for Dynamic Agent Scoring

FIG. 4 is a flow diagram of an illustrative process 400 that may be executed by a dynamic contact management system 100 to generate dynamic scores for agent accounts and take actions based upon those scores. Portions of the process 400 will be described with reference to the example authority hierarchy 200 shown in FIG. 2 and the example models shown in FIGS. 5A and 5B.

The process 400 shown in FIG. 4 begins at block 402. The process 400 may begin in response to an event, such as when the dynamic contact management system 100 begins operation, or receives initiation of a customer contact from a customer device 102. When the process 400 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 600 shown in FIG. 6 and described in greater detail below. For example, executable instructions for implementing the functionality of the action manager 110, contact manager 112, and/or dynamic score generator 114 may be loaded into memory and executed by a processor. In some embodiments, the process 400 or portions thereof may be implemented on multiple processors, serially or in parallel.

At block 404, the contact manager 112 or some other module or component of the dynamic contact management system 100 can receive information regarding a customer contact, such as a communication session initiated by a customer device 102. For example, a customer may have an issue with a particular item, and the customer may use a telephone to call a phone number associated with the dynamic contact management system 100. The contact manager 112 can receive the phone call or be notified of receipt of the phone call. The contact manager 112 may extract metadata from or associated with the telephone call, prompt the customer for information regarding the contact, or perform some other operation to determine information regarding the customer and subject of the contact.

At block 406, the dynamic score generator 114 or some other module or component of the dynamic contact management system 100 can access customer data for the customer account associated with the current contact. In some embodiments, the dynamic score generator 114 may obtain data regarding a history of the customer account. In some embodiments, the dynamic score generator 114 may obtain or generate a customer score that summarizes or represents the customer history and/or attributes of the customer account. For example, the dynamic score generator 114 may obtain a customer score indicative of a degree to which the customer account has used the dynamic contact management system 100 in the past to obtain refunds or other concessions (e.g., a scoring indicating customer abuse of the system), a degree to which the customer account has been difficult in prior contacts, a degree of priority or relative importance of the customer, etc.

At block 408, the dynamic score generator 114 or some other module or component of the dynamic contact management system 100 can access item data for an item associated with the current contact. In some embodiments, the dynamic score generator 114 may obtain data regarding a history of the item, such as data summarizing prior customer contacts regarding the item. In some embodiments, the dynamic score generator 114 may obtain or generate an item score that summarizes or represents the item history and/or attributes of the item.

At block 410, the dynamic score generator 114 or some other module or component of the dynamic contact management system 100 can access agent data for one or more agent accounts. For example, the information may include attribute information regarding an agent account, including data regarding: a tenure of the agent associated with the agent account, average handling time of the agent for previous contacts, positive feedback regarding handling contacts, number and/or value of certain actions taken, number and/or value of non-standard actions taken, ratio of action permission requests that have been granted or rejected by higher-level agent accounts, history with the current customer account and/or item, and the like. In some embodiments, the dynamic score generator 114 may obtain or generate an agent score, such as a score that represents a relative measurement (or a prediction of a relative measurement) of the effectiveness of the agent account with respect to an ideal agent account, or with respect to an identified most-effective agent account.

At block 412, the dynamic score generator 114 or some other module or component of the dynamic contact management system 100 can generate an input vector to be processed using a model to generate a dynamic score for a particular agent. The input vector can include information obtained above at blocks 404, 406, and/or 408. For example, the input vector can include several different elements. Individual elements can include individual values or data points, such as a first element for a customer score, a second element for an item identifier, a third element for certain data regarding agent history, etc.

At block 414, the dynamic score generator 114 or some other module or component of the dynamic contact management system 100 can process the input vector using one or more models to generate dynamic scores. FIG. 5A shows an example of a dynamic scoring model 520 that may be used in some embodiments. As shown, the dynamic scoring model 520 may receive an input vector with one or more data elements, such as a customer score 512, agent score 514, and item score 516. The dynamic scoring model may generate a dynamic score 522 as output. As described above, the customer score 512, agent score 514, and/or item score 516 may be obtained from one or more data stores, obtained from one or more score generators, or computed by the dynamic score generator 114. In some embodiments, an agent scoring model 510 may generate the agent score 514, either on-demand (e.g., after the dynamic contact management system 100 receives a customer contact) or asynchronously (e.g., in a batch process performed periodically). For example, the agent scoring model 510 may be a machine learning model that generates the agent score 514 using attribute data 502 regarding a particular agent account.

In some embodiments, the dynamic scoring model 520 may be a statistical model that computes the dynamic score 522 by, at least in part, applying weights to the customer score 512, agent score 514, and/or item score 516. Illustratively, the dynamic scoring model 520 may apply a first weight factor to the customer score 512, a second weight factor to the agent score 514, and a third weight factor to the item score 516. Any or all of the weights may be the same or different than any or all of the other weights. In one specific, non-limiting example, the dynamic score may be computed using equation [1] below, where W1, W2, and W3 are weights:

$$\text{Dynamic Score}=(W1\times\text{Customer Score})+(W2\times\text{Agent Score})+(W3\times\text{Item Score}) \quad [1]$$

In some embodiments, the dynamic score generator 114 may use a random forest model to process the input vector and dynamically generate weights for various inputs (e.g., individual scores as described above, individual agent account attributes, etc.), and the dynamic scoring model 520 to generate scores using the dynamically generated weights, as described above. FIG. 5B shows an example of a random forest model 550 that may be used in some embodiments. As shown, the random forest model 550 includes n decision trees, where n is a positive integer. For simplicity, only three decisions trees are shown: tree 556, tree 557, and tree 558, labeled tree 1, tree 2, and tree 3, respectively. However, in some embodiments, additional or fewer decision trees may be included in a random forest model 550.

As shown, an input vector 552 may be provided to each of the decision trees 556, 557, and 558. Each decision tree may be used to analyze the input vector 552, or some portion thereof (such as a particular element or subset of elements) at individual nodes. Based on the results of the analysis, particular branches of the decision trees may be followed to subsequent nodes, where additional analyses are performed.

By way of illustration, the first node 560 of decision tree 556 may compare an element of the input vector 552, such as a value of a particular agent account attribute, to a predetermined or dynamically determined threshold. If the value of the agent account attribute satisfies the threshold, then the process may proceed to node 562 of decision tree 556, where a different analysis is performed (e.g., the same data is compared to a different threshold or analyzed using a different method, a different element or subset of elements of the input vector 552 are analyzed, etc.). The process may continue until a leaf node is reached, such as leaf node 564. Leaf node 564 may be associated with one or more values for weighting factors, and the output of decision tree 556 may be the associated value(s).

Other decision trees 557 and 558 may be processed similarly, either in parallel or sequentially with processing of decision tree 556. For example, the first node 570 of decision tree 557 may compare the same element of the input vector 552 as node 560 to a different threshold, or the first node 570 may perform an analysis using a different element of the input vector 552. The processing of the input vector 552 using decision tree 557 may continue through subsequent nodes based on the results of the analyses until a leaf node is reached, such as leaf node 572. Leaf node 572 may be associated with one or more values for weighting factors that are the same or different than the values associated with leaf node 564 of decision tree 556, and the values may be the same or different than values associated with any or all of the other leaf nodes of decision tree 557. The processing of the input vector 552 using decision tree 558 may proceed from a first node 580 through its various nodes based on the results of the analyses until a leaf node is reached, such as leaf node 582. Leaf node 582 may be associated with one or more values for weighting factors that are the same or different than the values associated with leaf nodes 564 and/or 572, and the value may be the same or different than values associated with any or all of the other leaf nodes of decision tree 558.

The weighting factors 554 generated by the model 550 may be determined from the values generated using the individual decision trees 556, 557, and 558. In some embodiments, the weighting factors 554 generated by the model 550 may be means of individual decision tree values, medians of individual decision tree vales, modes of individual decision tree values, or the output of a function computed using some or all of the individual decision tree values.

Returning to FIG. 4, at block 416 the contact manager 112 or some other module or component of the dynamic contact management system 100 may analyze the dynamic score, generated above, with respect to one or more levels of an authority hierarchy. For example, the contact manager 112 may compare the dynamic score with thresholds of the authority hierarchy 200 shown in FIG. 2A. If the dynamic score exceeds thresholds associated with levels 202, 204, and 206, but does not exceed a threshold associated with level 208, then the contact manager 112 may determine that the agent account should be authorized at level 206, even though the agent account may be associated with level 202 or 204 by default.

At block 418, the contact manager 112 or some other module or component of the dynamic contact management system 100 may identify actions that are available for the agent account to perform with respect to the current customer contact. For example, as shown in FIG. 2A, there may be a different set of actions, or action parameters, associated with each of the authority hierarchy 200 levels. Based on the hierarchy level identified above, the contact manager 112 may determine that the agent account is to be authorized to perform the corresponding set of actions, or actions with the corresponding set of action parameters, to process the current customer contact. In some embodiments, the contact manager 112 may use the dynamic score to directly determine actions or action parameters for the agent account, rather than referring to an authority hierarchy 200 or group of associated actions. For example, agents may be permitted to issue refunds up to certain maximum values. The contact manager 112 may compute the maximum refund value for a particular agent account and customer contact directly, rather than determining a hierarchy level for the agent and then referred to a corresponding maximum refund value. In these embodiments, the use of a dynamic score may allow a dynamic contact management system 100 to be implemented without any preset hierarchy. Rather, the authorized actions and action parameters may be determined dynamically at run time, on a case-by-case basis, and may be optimized to achieve desirable outcomes rather than being determined as round numbers for rigid tiers.

At block 420, the contact manager 112 or some other module or component of the dynamic contact management system 100 may temporarily authorize the agent account to perform the actions determined above. For example, the contact manager 112 may generate and store data granting the agent account permission to perform the actions. Then, the agent associated with the agent account may proceed to perform one or more of the actions without first requiring manual approval by another agent account, or an agent associated with an agent account that is authorized to perform the actions by default. At block 422, the process 400 may terminate.

In some embodiments, scores generated by the dynamic score generator 114 may be used to analyze the expertise or performance of different agent accounts with respect to each other. For example, a heat map or other comparison may be generated and used to quickly compare some or all agent accounts of the dynamic contact management system 100.

In some embodiments, the dynamic score generator 114 or some other module or component of the dynamic content management system 100 may generate scores for one or more agent accounts using dynamically determined weighting factors. For example, the dynamic score generator 114 may use a statistical model to compute a score with a value between 0 and 1, where higher values indicate a higher likelihood of a satisfactory or recommended contact resolution, or indicate the agent is to be permitted to perform additional actions or actions associated with a higher level of the authority hierarchy 200 than the level to which the agent is currently assigned. The computations performed using the statistical model may depend on the values of individual weights, such as weighting factors generated using a random forest model (e.g., as shown in FIG. 5B). For example, the statistical model my use a value of a particular agent account attribute, such as tenure or average handling time, while generating a score for the agent account. Depending upon the context of the current customer contact, the attribute may be weighted more or less heavily than other attributes, and more or less heavily than if the context were different. In this way, the dynamic score generator 114 can account for the differences in the context of customer contacts when generating scores for agent accounts. The actions authorized for the particular agent, or the agent selected to handle the contact, can therefore be determined in a dynamic manner and may be responsive to changing context, changing agent-specific attributes, and the like.

Execution Environment

Figure 6:
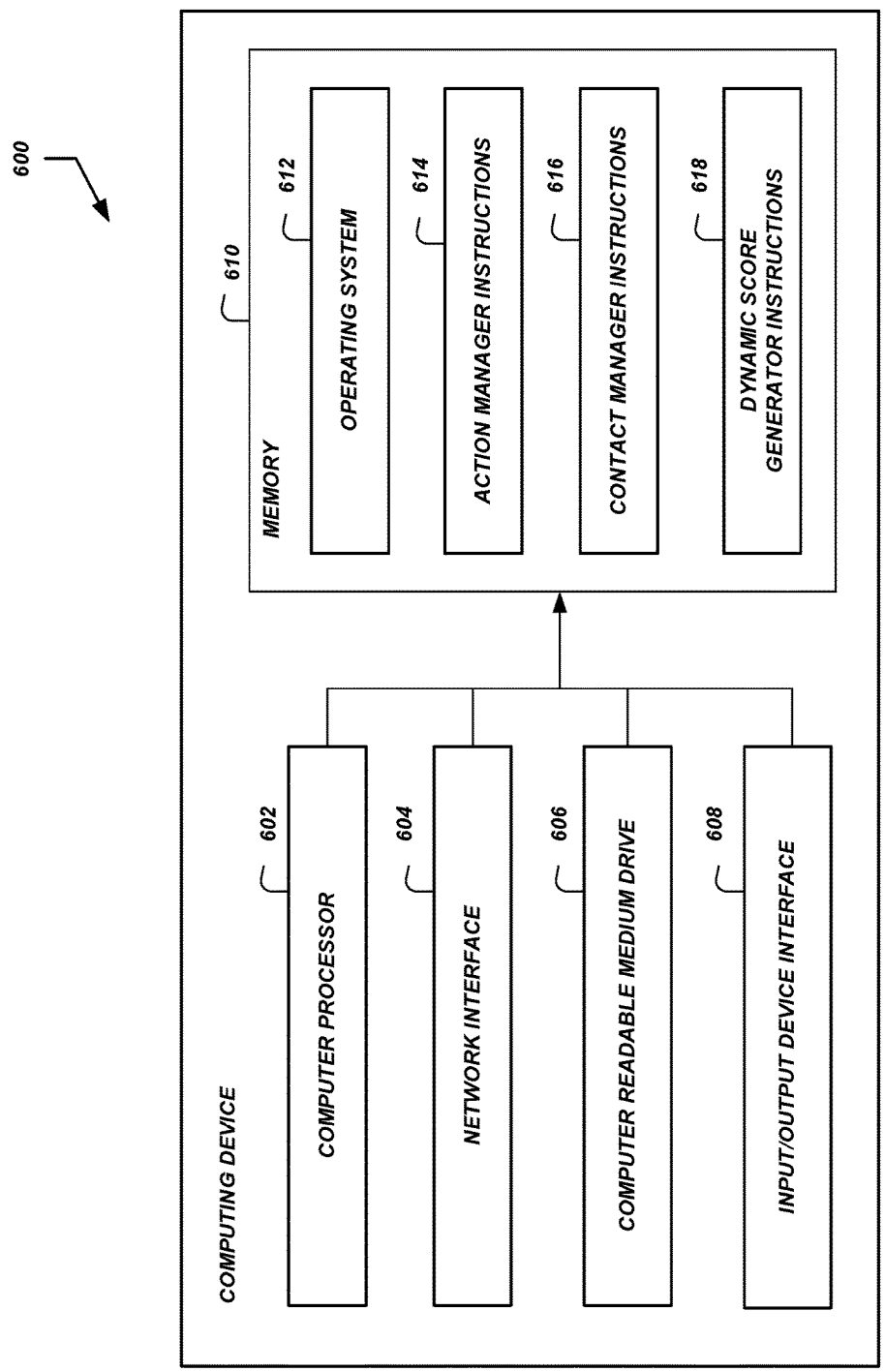
FIG. 6 is a block diagram illustrating components of a computing device configured to execute processes for dynamic scoring and/or training of models according to some embodiments.

FIG. 6 illustrates the various components of an example computing device 600 configured to implement some or all of the functionality of the dynamic contact management system 100. In some embodiments, as shown, the computing device 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media.

The computer readable memory 610 may include computer program instructions that one or more computer processors 602 execute in order to implement one or more embodiments. The computer readable memory 610 can store an operating system 612 that provides computer program instructions for use by the computer processor(s) 602 in the general administration and operation of the computing device 600. In some embodiments, the computer readable memory 610 can further include computer program instructions and other information for implementing aspects of the present disclosure. For example, in one embodiment, the computer-readable memory 610 may include action manager instructions 614 for implementing features of the action manager 110, contact manager instructions 616 for implementing features of the contact manager 112, and/or dynamic score generator instructions 618 for implementing features of the dynamic score generator 114.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory storing executable instructions; and
   one or more processors in communication with the computer-readable memory and configured by the executable instructions to at least:
      receive a telephone call from a user device, wherein the telephone call is associated with a user account;
      determine an item to which the telephone call relates;
      obtain from a network-accessible data store:
         user account data representing a history of the user account;
         item data representing a history of the item;
         agent account data representing history of a plurality of agent accounts;
      generate an input vector using the user account data, the item data, and the agent account data;
      generate a set of weighting factors using the input vector and a random forest model, wherein the random forest model generates the set of weighting factors based on evaluating at least one of the account data, item data, and agent data against a plurality of test conditions;
      generate a score for an agent account of the plurality of agent accounts using the set of weighting factors and a statistical model, wherein the set of weighting factors represents weights with which respective attributes of agent account data are to be weighted when generating the score;
      select the agent account based at least partly on the score being higher then scores generated for one or more other agent accounts of the plurality of agent accounts;
      compare the score to one or more thresholds of an authority hierarchy, wherein individual levels of the authority hierarchy are associated with authorized actions for telephone call processing;
      select a level of authority based at least partly on comparing the score to the one or more thresholds of the authority hierarchy;
      connect the telephone call to an agent device associated with the agent account; and
      temporarily grant the agent account the level of authority to process the telephone call.

2. The system of claim 1, wherein the agent account is assigned to a default level of authority, and wherein the temporary grant of the level of authority to the agent account comprises a temporary grant of a higher level of authority than the default level of authority.

3. The system of claim 1, wherein the executable instructions to temporarily grant the agent the level of authority to process the telephone call comprise executable instructions to:
   permit performance of an action that would not be permitted for the agent account without a grant of the level of the authority; and
   revoke the level of authority based at least partly on completed processing of the telephone call.

4. The system of claim 1, wherein the attributes of agent account data comprise at least one of: a tenure, an average handling time, customer feedback, a quantity of a particular action taken with respect to prior contacts, a value of a particular action taken with respect to prior contacts, a ratio of requested action permission rejections, or a quality metric associated with prior contacts and the user account.

5. A computer-implemented method comprising:
   as performed by a computing system comprising one or more computer processors configured to execute specific instructions,
      establishing a communication session with a first computing device;
      generating a score for an agent account using a model and data representing one or more historical performance attributes associated with the agent account, wherein the model is trained based at least partly on historical performance attributes associated with a plurality of different agent accounts;
      analyzing the score with respect to one or more thresholds of an authority hierarchy, wherein individual levels of the authority hierarchy are associated with authorized actions for communication session processing;
      selecting a level of authority based at least partly on analyzing the score with respect to the one or more thresholds of the authority hierarchy; and
      temporarily granting the agent account the level of authority to process the communication session.

6. The computer-implemented method of claim 5, wherein selecting the level of authority comprises selecting a higher level of authority than a default level of authority associated with the agent account.

7. The computer-implemented method of claim 5, further comprising:
   generating a second score for a second agent account using the model and data representing one or more historical performance attributes associated with the second agent account; and
   selecting the agent account based at least partly on the score being higher than the second score.

8. The computer-implemented method of claim 5, further comprising connecting a telephone call to a computing device associated with the agent account, wherein the communication session comprises the telephone call.

9. The computer-implemented method of claim 5, further comprising:
   obtaining training data representing (1) a plurality of historical performance attributes associated with a first agent account of the plurality of different agent accounts, and (2) permitted actions and prohibited actions associated with prior contacts processed by the first agent account, wherein the plurality of historical performance attributes comprises at least one of: a tenure, an average handling time, customer feedback, a quantity of a particular action taken with respect to prior contacts, a value of a particular action taken with respect to prior contacts, a ratio of requested action permission rejections, or a quality metric associated with prior contacts and the first agent account; and training the model using the training data.

10. The computer-implemented method of claim 5, further comprising:

receiving, from a computing device associated with the agent account, a command to perform an action with respect to the communication session; and performing the command based at least partly on temporarily granting the agent account the level of authority.

11. The computer-implemented method of claim 10, wherein performing the command comprises initiating a transaction having a value exceeding a maximum value associated with a default level of authority of the agent account.

12. The computer-implemented method of claim 10, wherein performing the command comprises at least one of: causing initiation of a payment, or causing initiation of an item delivery.

13. The computer-implemented method of claim 5, further comprising:

obtaining from a network-accessible data store:

user account data representing a history of a user account associated with the communication session; and item data representing a history of an item associated with the communication session; and generating an input vector using the user account data, the item data, and agent account data, wherein generating the score comprises using the input vector.

14. A system comprising:

computer-readable memory storing executable instructions; and one or more processors in communication with the computer-readable memory and configured by the executable instructions to at least:

establish a communication session with a first computing device;

generate a score for an agent account using a model and data representing one or more historical performance attributes associated with the agent account, wherein the model is trained based at least partly on historical performance attributes associated with a plurality of different agent accounts;

analyze the score with respect to one or more thresholds of an authority hierarchy, wherein individual levels of the authority hierarchy are associated with authorized actions for communication session processing;

select a level of authority based at least partly on analyzing the score with respect to the one or more thresholds of the authority hierarchy; and temporarily grant the agent account the level of authority to process the communication session.

15. The system of claim 14, wherein the executable instructions to select the level of authority comprise executable instructions to select a higher level of the authority than a default level of authority associated with the agent account.

16. The system of claim 14, wherein the one or more processors are further programmed by the executable instructions to:

generate a second score for a second agent account using the model and data representing one or more historical performance attributes associated with the second agent account; and select the agent account based at least partly on the score being higher than the second score.

17. The system of claim 14, wherein the one or more processors are further programmed by the executable instructions to connect a telephone call to a computing device associated with the agent account, wherein the communication session comprises the telephone call.

18. The system of claim 14, wherein the one or more processors are further programmed by the executable instructions to:

obtain training data representing (1) a plurality of historical performance attributes associated with a first agent account of the plurality of different agent accounts, and (2) permitted actions and prohibited actions associated with prior contacts processed by the first agent account, wherein the plurality of historical performance attributes comprises at least one of: a tenure, an average handling time, customer feedback, a quantity of a particular action taken with respect to prior contacts, a value of a particular action taken with respect to prior contacts, a ratio of requested action permission rejections, or a quality metric associated with prior contacts and the first agent account; and train the model using the training data.

19. The system of claim 14, wherein the one or more processors are further programmed by the executable instructions to initiate, based at least partly on the temporary grant of the level of authority, a transaction having a value exceeding a maximum value associated with a default level of authority of the agent account.

20. The system of claim 14, wherein the one or more processors are further programmed by the executable instructions to:

obtain from a network-accessible data store:

user account data representing a history of a user account associated with the communication session; and item data representing a history of an item associated with the communication session; and generate an input vector using the user account data, the item data, and agent account data, wherein generating the score comprises using the input vector.

* * * * *